United States Patent [19]

Hersey

[11] Patent Number: 4,829,785
[45] Date of Patent: May 16, 1989

[54] CRYOGENIC COOLING SYSTEM WITH PRECOOLING STAGE

[75] Inventor: Devin W. Hersey, Kent, Wash.

[73] Assignee: The Boeing Company, Seattle, Wash.

[21] Appl. No.: 256,206

[22] Filed: Oct. 11, 1988

Related U.S. Application Data

[63] Continuation of Ser. No. 128,945, Dec. 4, 1987, abandoned.

[51] Int. Cl.⁴ .............................................. F25B 1/00
[52] U.S. Cl. ........................................ 62/467; 62/335; 62/51.2
[58] Field of Search .................... 62/335, 467, 514 R

[56] References Cited

U.S. PATENT DOCUMENTS

| | | | |
|---|---|---|---|
| 3,489,670 | 1/1970 | Maget | 204/129 |
| 4,111,002 | 9/1978 | Van Mal et al. | 62/467 |
| 4,118,299 | 10/1978 | Maget | 204/180 |
| 4,409,799 | 10/1983 | Nishizaki et al. | 62/467 |
| 4,593,534 | 6/1986 | Bloomfield | 62/467 |
| 4,643,000 | 2/1987 | Rheinfelder | 62/514 R |
| 4,671,080 | 6/1987 | Gross | 417/48 |
| 4,697,425 | 10/1987 | Jones | 62/467 |

Primary Examiner—Ronald C. Capossela
Attorney, Agent, or Firm—Christensen, O'Connor, Johnson & Kindness

[57] ABSTRACT

A cryogenic cooling system using hydrogen as a primary refrigerant fluid and oxygen as a secondary refrigerant fluid to precool the hydrogen gas below its inversion temperature. In a first embodiment, the cryogenic cooling system (10) includes an electrochemical compressor (12) operative to compress hydrogen and oxygen gas without any moving parts. Compressed oxygen from the electrochemical compressor passes through a regenerative heat exchanger (24) in heat transfer relationship with low pressure oxygen, and expands through a Joule-Thomson expansion valve (28) absorbing heat from a compressed hydrogen gas stream in a precooler heat exchange (30). The low pressure oxygen provides additional cooling in a parasitic heat exchangeer (36), returning to the electrochemical compressor through the regenerative heat exchanger (24). Compressed hydrogen flows through a regenerative heat exchange (44) in heat transfer relationship with low pressure hydrogen, and is precooled as it passes through the precooler heat exchanger. A second regenerative heat exchaner (50) provides additional heat transfer with the low pressure hydrogen gas stream prior to expansion of the compressed hydrogen in a Joule-Thomson expansion valve (54). The expanding hydrogen cools a load in heat exchanger (58), returning to the electrochemical compressor through regenerative heat exchangers 44 to 50. In the second embodiment, a mechanical water pump is provided to compress water, which is used as an intermediate media between the low pressure and high pressure hydrogen and oxygen gas streams. In both embodiments, the hydrogen and oxygen gas are electrochemically combined into water using a catalytic membrane (124) and then disassociated by electrolysis into their respective oxygen and hydrogen gas streams using another catalytic membrane (144).

44 Claims, 5 Drawing Sheets

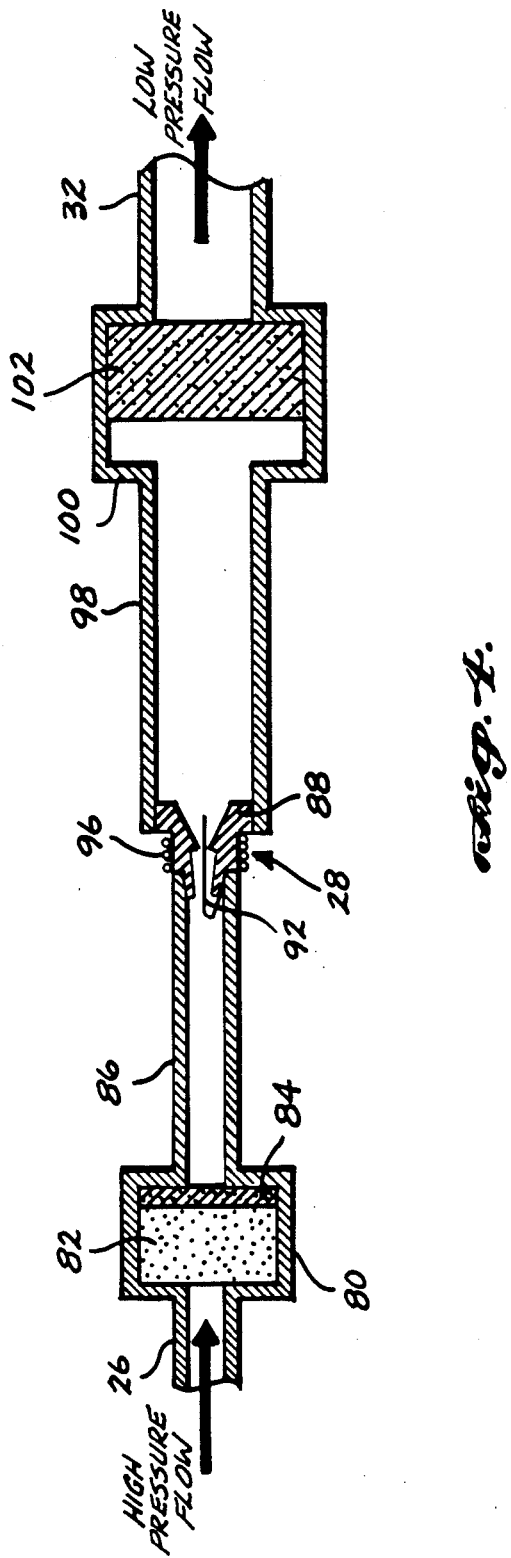

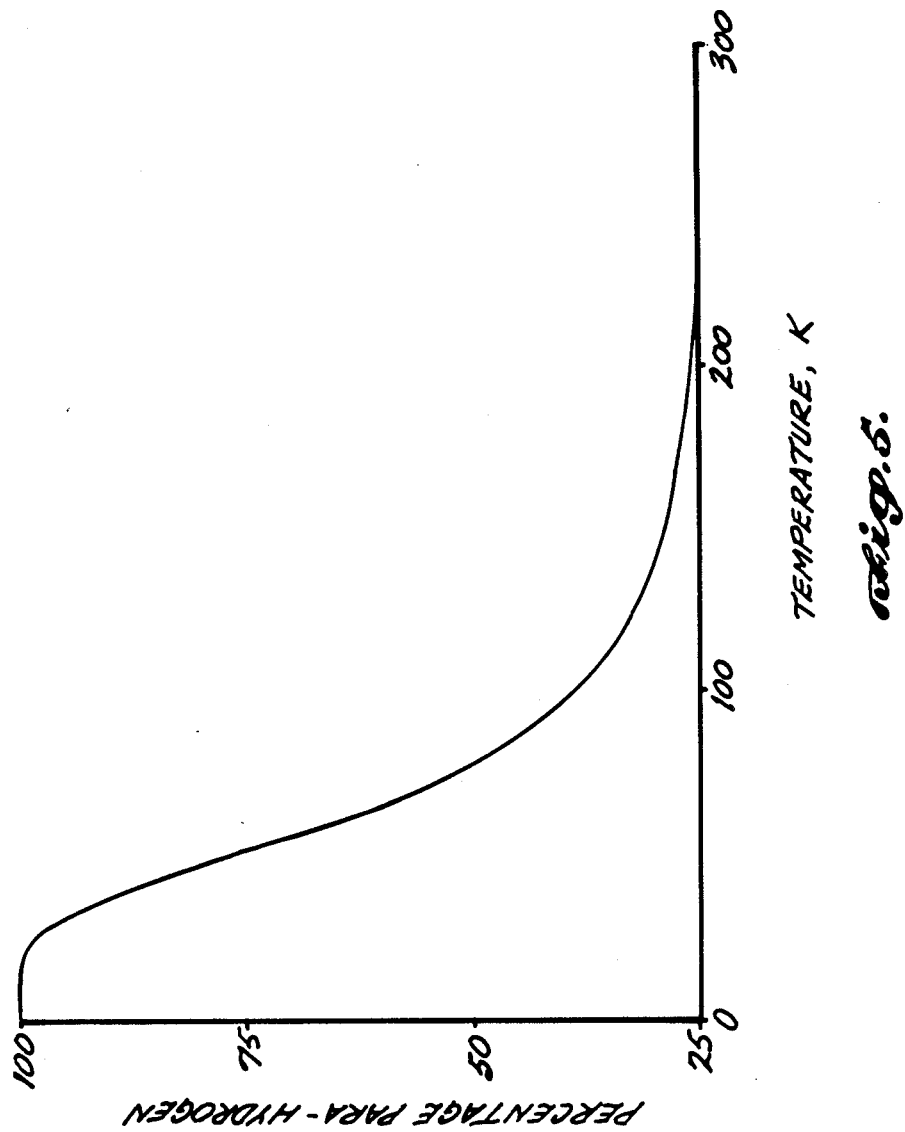

CRYOGENIC COOLING SYSTEM WITH PRECOOLING STAGE

This application is a continuation application based on prior copending application Ser. No. 128,945, filed on Dec. 4, 1987, now abandoned.

TECHNICAL FIELD

This invention generally relates to a cryogenic refrigeration system, and specifically to a cryogenic refrigeration system using an electrochemical compressor.

BACKGROUND OF THE INVENTION

Cryogenic cooling is essential for the operation of sensitive infrared imaging devices, infrared interferometers, extremely low noise electronic circuits, and other apparatus used on satellites and planetary probes. A refrigeration system suitable for cooling such apparatus represents a significant technological problem, particularly when the cryogenic refrigeration system must function for an extended period of time without possibility of repair. Although a dewar flask containing an expendable cryogenic fluid might provide a short-term source of low temperature coolant, this solution is not practical for long duration missions. To provide such cooling for an extended period, a dependable closed loop cryogenic cooling system is required.

Conventional mechanical cryogenic refrigeration systems cannot provide the reliability essential for operation where repair is impractical. Attempts to extend the life of conventional mechanical cryogenic refrigeration systems by providing redundant critical components and using the highest quality materials have achieved only limited success.

A prospective solution to this problem appears in commonly assigned U.S. Pat. No. 4,671,080. In the closed cryogenic cooling systems disclosed in this patent, an electrochemical pump is used to provide a pressurized gas stream of hydrogen (or oxygen) to a high pressure flow path. One or more heat exchangers are provided in heat transfer relationship with the pressurized flow path for cooling the gas below its inversion temperature (the highest temperature at which throttling will reduce its temperature). The cooled, pressurized gas expands through a Joule-Thomson flow restrictor into a load heat exchanger, providing cryogenic cooling to components that are attached thereto. The gas follows a low pressure flow path, returning in a closed loop to the electrochemical pump. Before completing the cycle, it passes through a regenerative heat exchanger, cooling the high pressure gas. Since the cryogenic cooling system disclosed in this patent uses no moving parts, it potentially has a much longer usable life than a mechanical cryogenic cooling system.

Alternate approaches to constructing an electrochemical pump for either hydrogen or for oxygen are disclosed in the above-referenced patent. Generally, such a pump comprises a solid electrolyte membrane sandwiched between a porous anode and cathode. The membrane is operative to pump either hydrogen ions (protons) or hydronium ions($H_3O^+$). With respect to the latter, water is formed at the cathode as a by-product that must be separated from the pressurized hydrogen. A similar electrochemical pump for oxygen, employing an ionic membrane conductor for oxygen ions is also disclosed in the patent.

In a cryogenic cooling system employing hydrogen as the working fluid, like that of U.S. Pat. No. 4,671,080, it is necessary to precool the compressed hydrogen gas below its inversion temperature (160 K.) prior to throttling it through a Joule-Thomson valve. In fact, the efficiency of the refrigeration cycle is greatly improved as the gas is further cooled below its inversion temperature. Regenerative cooling of the pressurized gas using the cool low pressure gas reduces the cooling available for the load, i.e., does not improve the refrigeration cycle efficiency. Precooling using sun shielded radiating surfaces exposed to the vacuum of space would require unacceptably large radiators.

Accordingly, it is an object of the present invention to provide a closed cryogenic cooling system which includes means for precooling a primary cryogenic working fluid well below its inversion temperature. It is a further object of the invention to improve the refrigeration cycle efficiency of a closed cryogenic cooling system, as compared to the prior art.

These and other objects of the present invention will be apparent from the attached drawings and the disclosure of the preferred embodiments that follows.

SUMMARY OF THE INVENTION

A cryogenic refrigeration system includes an electrochemical compressor for compressing a first and a second cryogenic gas. Connected to the compressor are a first and second cooling loop, the first loop providing precooling for the second, and the second loop cooling a primary load to a temperature that is substantially below the minimum temperature achieved by the first cooling loop.

Means are provided for conveying the first cryogenic gas in the first cooling loop, and expanding the compressed first cryogenic gas to precool the second gas. After cooling the second gas, the first cryogenic gas is conveyed to the electrochemical compressor, completing its closed loop.

Similarly, the cryogenic cooling system includes means for conveying the second cryogenic gas in the second loop, including means for expanding the precooled, compressed second cryogenic gas to cool the primary load, and for returning the expanded second cryogenic gas to the electrochemical compressor. Although other cryogenic gases might be used, in the preferred embodiment, the first cryogenic gas comprises oxygen and the second comprises hydrogen. In the electrochemical compressor, fuel cell means are operative to ionize the molecular hydrogen and oxygen, and in a catalytic reaction, to chemically combine ions of the two substances to form water, producing an electrical current. The electrochemical compressor further includes electrolysis means for disassociating the water molecules into the separate compressed first and second cryogenic gases comprising hydrogen and oxygen molecules, using an electric current. Electric current produced by the fuel cell means provides at least a portion of the current required by the electrolysis means.

Regenerative heat exchange means in the first cooling loop effect heat transfer with the expanded first cryogenic gas, cooling the compressed gas prior to its expansion through an orifice. A similar regenerative heat exchange means and orifice is provided in the second cooling loop, for cooling the second cryogenic gas. The preferred embodiment of the present invention includes no moving parts. However, in an alternative embodiment, the water produced by the fuel cell means is pressurized using pump means, prior to its disassociation by the electrolysis means.

BRIEF DESCRIPTION OF THE DRAWINGS

FIG. 4 is a schematic diagram of a Joule-Thomson valve used in the present invention; and FIG. 5 is a graph showing the equilibrium percentage of parahydrogen compared to orthohydrogen as a function of temperature, K.

DISCLOSURE OF THE PREFERRED EMBODIMENTS

Figure 1:
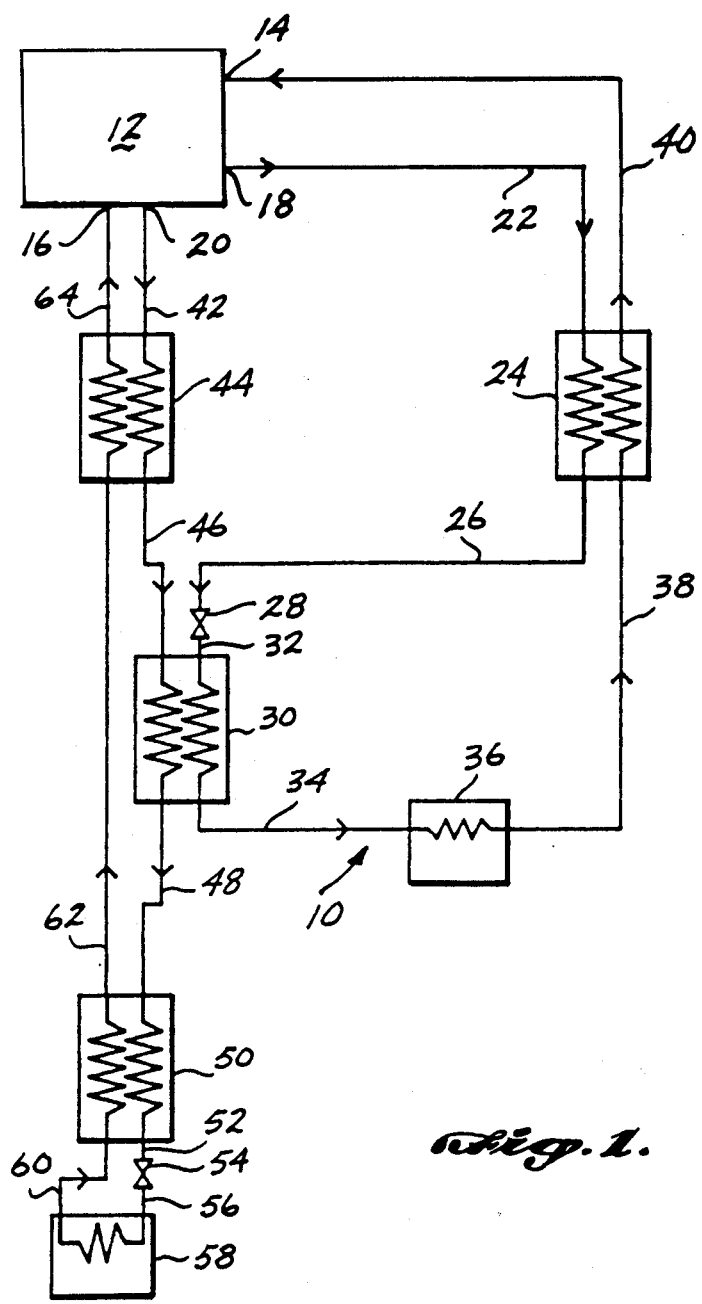
FIG. 1 is a schematic diagram of a first embodiment of the cryogenic cooling system.

With reference of FIG. 1, a first preferred embodiment of the present cryogenic cooling system is shown, generally denoted by reference numeral 10. A key element in the cryogenic cooling system is electrochemical compressor 12, which is provided with low pressure input ports for oxygen 14 and hydrogen 16, and discharge ports 18 and 20 for high pressure oxygen and high pressure hydrogen, respectively. Details concerning the operation of the electrochemical compressor 12 are explained below.

Cryogenic cooling system 10 represents a further development of a cooling system disclosed in U.S. Pat. No. 4,671,080, discussed above in the Background of the Invention, and incorporated herein by reference. In the present invention, all heat is rejected above 280 K. and a substantial improvement in the efficiency of the refrigeration cycle is achieved by precooling compressed hydrogen below its inversion temperature using a compressed oxygen cooling loop. As noted previously, the inversion temperature of a gas is the highest temperature at which throttling of the gas through an expansion device will decrease the temperature of the gas. The inversion temperature of hydrogen is approximately 160 K. In comparison, the inversion temperature of oxygen is well above 700 K., and in fact, oxygen provides very efficient cooling when running with a nominal precooling temperature of 280 K. Accordingly, oxygen makes an ideal secondary fluid in cryogenic cooling system 10 for precooling the compressed hydrogen to approximately 80 K.

Compressed oxygen, $O_2$, is discharged from electrochemical compressor 12 through discharge port 18 into high pressure line 22. Line 22 is connected to a regenerative heat exchanger 24, which provides heat transfer between the high pressure oxygen and low pressure oxygen returning to electrochemical compressor 12. The pressure of oxygen within line 22 is approximately 20 MPa, and its temperature is approximately 280 K. Upon exiting regenerative heat exchanger 24, its pressure is substantially the same because the flow impedance of the regenerative heat exchanger is very low; however, the temperature of the oxygen is reduced to about 175 K.

Line 26 conveys the compressed oxygen to a Joule-Thomson expansion valve 28. Details of the Joule-Thomson valve 28 are shown in FIG. 4. High pressure gas enters from the left, in the figure, flowing into an upstream condensable gas trap 80, which contains a molecular sieve 82. A porous sintered nickel plate 84 is disposed downstream of the molecular sieve, to further assist in trapping condensable gases, such as argon, or other trace impurities that have condensed at the temperature of the compressed oxygen. The pressurized oxygen passes through molecular sieve 82 and sintered porous nickel plate 84 into a thin wall stainless steel thermal standoff tube 86. Tube 86 is connected to a throttle plug 88, which comprises an orifice 90 through which extends a small diameter cooper wire 92, which is fastened to the upstream side of the throttle plug. Copper wire 92 provides a substantial restriction in orifice 90, greatly impeding gas flow through the orifice. A resistance heating element 96 is wrapped around throttle plug 88. Electric current is cycled through element 96 for a few seconds each hour, providing from one to two joules of heat to melt any ice or other frozen solids that might otherwise block the orifice. An expansion tube 98 is connected to throttle plug 88, in receipt of the gas expanding through orifice 90. On the downstream end of expansion tube 98 is a catch trap 100 in which a sintered porous nickel plug 102 is provided to prevent frozen solids entrained in the oxygen from being carried downstream.

Expansion valve 28 greatly restricts the flow of oxygen into precooler heat exchanger 30, permitting the compressed oxygen to expand adiabatically as it flows through line 32 into a precooler heat exchanger 30. The expanding oxygen cools rapidly to about 80 K., a substantial portion changing to a liquid. The liquified oxygen vaporizes, isothermally absorbing heat from a stream of compressed hydrogen that also flows through the precooler heat exchanger. The pressure of oxygen exiting precooler heat exchanger 30 is approximately 30 KPa, and its temperature remains approximately 80 K. The low pressure oxygen flows through line 34 to a parasitic heat exchanger 36, which is optionally provided to absorb heat from other sources in the environment in which the cryogenic cooling system is installed. For example, heat radiating into the enclosure in which the cryogenic cooling system is operating, due to sun loading or to dissipated heat from electronic components mounted adjacent thereto, may be absorbed by the parasitic heat exchanger, preventing heat build-up in the enclosure from degrading the operation of the system. Heat transfers to the low pressure oxygen isothermally in parasitic heat exchanger 36, vaporizing substantially all the remaining liquefied oxygen so that the temperature of the low pressure oxygen being conveyed from the parasitic heat exchanger to the regenerative heat exchanger 24 through line 38 remains about 80 K. As the low pressure oxygen gas passes through regenerative heat exchanger 24, its temperature increases to approximately 276 K. due to heat absorbed from the compressed oxygen. The warmed low pressure oxygen passes through line 40, reentering electrochemical compressor 12 through port 14 to complete its cycle.

Compressed hydrogen is conveyed through high pressure line 42 from the electrochemical compressor to regenerative heat exchanger 44, where it transfers heat to colder low pressure hydrogen. The pressure of hydrogen as it exits electrochemical compressor 12 is approximately 12 MPa, and its temperature is 280 K. Upon exiting regenerative heat exchanger 44, the pressure of the hydrogen is substantially the same, but its temperature has decreased to approximately 99 K. High pressure hydrogen is conveyed from regenerative heat exchanger 44 through line 46 into precooler heat exchanger 30, in which its temperature is reduced to approximately 80 K. by heat transferred to vaporize the liquified oxygen, as noted above. The precooled, compressed hydrogen flows through line 48 into a second regenerative heat exchanger 50, in which the hydrogen is further cooled by heat transfer with low pressure hydrogen, exiting into line 52. The temperature of hydrogen in line 52 as it enters Joule-Thomson expansion valve 54 is approximately 36.9 K. Expansion valve 54 has substantially the same structure as expansion valve 28, which is used in the oxygen loop; it permits only a very restricted flow of hydrogen gas to pass into line 56. As the hydrogen expands adiabatically into line 56, its temperature drops to about 20.2 K., and some of the hydrogen changes into a liquid. The pressure of the hydrogen at this point in the cycle is approximately 100 KPa. Line 56 conveys the mixture of hydrogen gas and liquid into a load heat exchanger 58, in which the liquid vaporizes, isothermally absorbing heat from a load that is attached thereto.

As previously explained, the load cooled by the vaporizing hydrogen gas might comprise electronic components, an infrared imaging system, or other apparatus requiring cryogenic cooling for an extended period of time. In the preferred embodiment, the hydrogen cools the load heat exchanger to a temperature of approximately 20.2 K. Thereafter, the cold, low pressure hydrogen enters regenerative heat exchanger 50 through line 60. As it passes through regenerative heat exchanger 50, the low pressure hydrogen absorbs heat from the compressed precooled hydrogen, increasing in temperature to about 78.8 K. The low pressure hydrogen then passes through line 62 into regenerative heat exchanger 44. A further substantial increase in temperature occurs as the low pressure hydrogen gas absorbs heat from the compressed hydrogen in regenerative heat exchanger 44. The low pressure hydrogen exits regenerative heat exchanger 44 and returns to electrochemical compressor 12 through line 64, reaching a temperature of 276 K. at the point at which it enters port 16.

TABLE I

| ASSUMED CONDTIONS | |
|---|---|
| Compressor Power | 340 watts |
| Hydrogen Mass Flow | 7.3 mg/s |
| Oxygen Mass Flow | 49.9 mg/s |
| Precooler Heat Load | 1.65 watts |
| Parasitic Heat Load | 0.68 watts |
| Refrigeration Heat Load | 1.00 watt |
| Regenerative Heat Exchanger Efficiency | 98% |

Table I illustrates the conditions assumed for the operation of the first embodiment of the cryogenic system to produce the pressures and temperatures of hydrogen and oxygen at the various points in each of their respective loops set forth above. In the preferred embodiment, only 1.00 watt of load cooling is provided at 20 K.; however, cryogenic cooling system 10 may be scaled to provide additional or less load cooling, as required for any given application. Furthermore, conditions in the cryogenic cooling system may be modified to accommodate more or less parasitic load cooling by varying the hydrogen precooling temperature achieved in precooling heat exchanger 30. The requirements for compressor power relative to the selected precooling temperature, precooler load, and parasitic load are shown in Table II.

TABLE II

| Precooling Temp. (K) | Precooler Load (Watts) | Parasitic Load (Watts) | Compressor Power (Watts) |
|---|---|---|---|
| 60 | 1.44 | 0.03 | 246 |
| 70 | 1.53 | 0.29 | 284 |
| 80 | 1.65 | 0.68 | 340 |
| 90 | 1.80 | 1.12 | 401 |
| 100 | 2.04 | 1.88 | 535 |
| 120 | 2.66 | 4.01 | 900 |
| 140 | 5.59 | 14.10 | 2625 |

Figure 2:
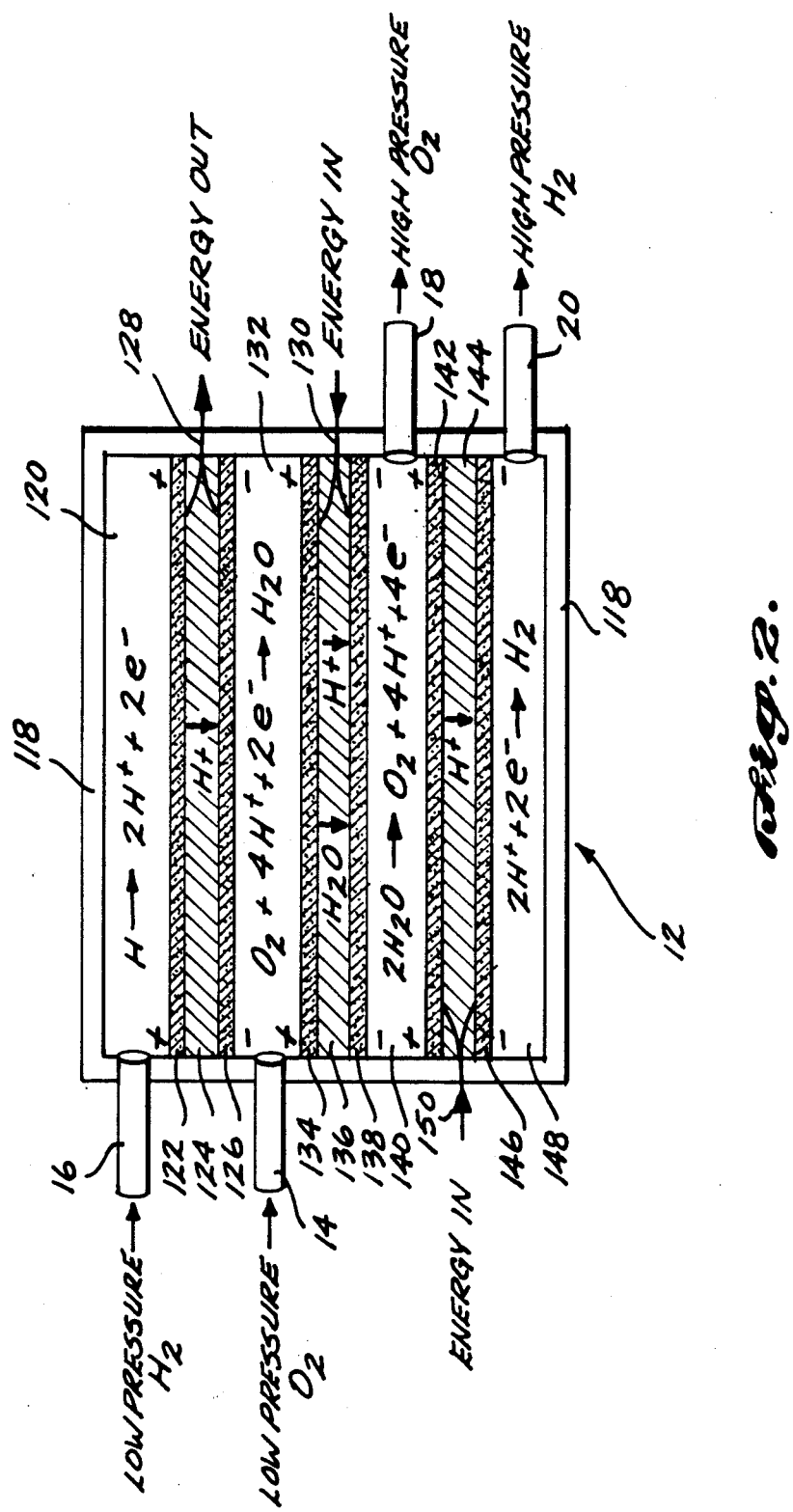
FIG. 2 is a schematic diagram of an electrochemical pump used in the present invention.

Turning now to FIG. 2, details of electrochemical compressor 12 are illustrated with reference to the electrochemical processes that are carried out in combining low pressure hydrogen and oxygen and producing separate compressed output streams of these gases. Electrochemical compressor 12 comprises an enclosure 118, having ports 14 and 16 for low pressure oxygen and hydrogen, and discharge ports 18 and 20 for high pressure oxygen and hydrogen, respectively.

FIG. 2 is not intended to illustrate details of the internal *structure* of the electrochemical compressor, but merely serves as a means for explaining the reactions that take place therein. Low pressure hydrogen entering enclosure 118 through input port 16 flows into a chamber 120 separated from a similar chamber 132 into which low pressure oxygen flows, by a sandwiched layer comprising a porous anode 122, a catalytic membrane 124, and a porous cathode 126. Catalytic membrane 124 includes a catalyst at the anode 122 that converts molecular hydrogen, $H_2$, to two hydrogen ions (protons), according to the following equation:

$$H_2 \rightarrow 2H^+ + 2e^- \tag{1}$$

The hydrogen ions are transported through the porous anode and cathode, and the membrane, a catalyst causing them to combine at the cathode with the molecular oxygen in chamber 132, according to the following equation:

$$O_2 + 4H^+ + 2e^- \rightarrow H_2O \tag{2}$$

As a by-product of the catalytic combination of hydrogen and oxygen, an electrical potential difference is developed between the porous anode 122 and porous cathode 126, producing an electrical current carried by conductors 128. This electrical current is used to supply part of the energy requirement needed by the remainder of the electrochemical compressor (to compress oxygen and hydrogen). An electric current is supplied to a porous anode 134 and porous cathode 138 that are sandwiched on each side of a catalytic membrane 136, causing water and hydrogen ions to be pumped from chamber 132 through catalytic membrane 136 into chamber 140. The hydrogen ions are attracted to the cathode 138 and carry the water molecules along as they pass through the membrane.

Another sandwiched layer comprising a porous anode 142, a catalytic membrane 144, and a porous cathode 146 is operative to dissociate the water into oxygen and hydrogen molecules. A catalytic reaction occurs at the anode 142, wherein the water molecules are separated into oxygen molecules, hydrogen ions and free electrons as shown in Equation 3 below:

$$2H_2O \rightarrow O_2 + 4H^+ + 4e^- \tag{3}$$

The pressure within chamber 140 is substantially greater than the pressure in chambers 120 and 132, being equal to the pressure of compressed oxygen upstream of the Joule-Thomson expansion valve in the oxygen loop, i.e., 20 MPa in the preferred embodiment.

A further catalytic reaction occurs at cathode 146 where hydrogen ions from chamber 140 that have passed through catalytic membrane 144 into chamber 148 combine with electrons as shown in Equation 4:

$$2H^+ + 2e^- \rightarrow H_2 \tag{4}$$

To induce the catalytic reactions that occur at anode 142 and cathode 146, an electrical current is supplied through conductor 130 to porous anode 142 and porous cathode 146. Due to the flow resistance of the porous anode 142, catalytic membrane 144, and porous cathode 146, the pressure of the hydrogen gas formed in chamber 148 is lower than that in chamber 140, i.e., 12 MPa compared to 20 MPa.

Operation of electrochemical compressor 12 is almost independent of the pressure of compressed oxygen in chamber 140 (and of the pressure of compressed hydrogen in chamber 148). Since the reactions set forth in Equations 1-4 are nearly reversible, the energy losses of the electrochemical compressor are due primarily to electrical resistance in the catalytic membranes. The compression process requires relatively small amounts of power compared to the power required for disassociating the water molecules into molecular oxygen and molecular hydrogen at porous anode 142 and porous cathode 146. Since the major cause of inefficiency, electrical resistance, is not affected by pressure differential between chambers 132 and 140, the compression process is nearly isentropic. The voltage equation describing the electrochemical compression process is given in Equation 5:

$$V = \zeta_o + J\rho_o + \frac{RT}{2F} \ln \frac{P_o}{P_i} \tag{5}$$

where
$\zeta_o$ = electrode polarization (ionization voltage reaction)
J = current density (over area of membrane)
$\rho_o$ = electrochemical cell resistivity
R = gas constant
F = Faraday constant
$P_o$ = outlet pressure (of compressed $O_2$)
$P_i$ = inlet pressure (of $H_2$ and $O_2$)

From Equation 5, it is apparent that the voltage required for the electrochemical compression process is a function of the natural logarithm of the ratio of oxygen discharge pressure to inlet pressure, whereas the voltage varies directly with the resistivity of the electrochemical cell. Accordingly, very little power is required to compress the oxygen (and hydrogen) to a relatively high discharge pressure.

The energy consumed by the third catalytic membrane 144 to disassociate water into oxygen and hydrogen is approximately 10 times the energy required by catalytic membrane 136 to pressurize water molecules. At least a portion of the energy requirements of the electrochemical processes carried out by catalytic membranes 136 and 144 is supplied by the energy produced by the electrochemical reaction that occurs in catalytic membrane 124. Energy requirements for electrochemical reactions occurring at these membranes that are not met by the current flowing from catalytic membrane 124 must be provided by an external source, for example, by a solar cell array or other power source (not shown).

Catalytic membranes 124, 136 and 144 preferably comprise a Nafion membrane (No. 117 or 125 provided by DuPont Chemical Corporation) thinly coated on each side with a platinum catalyst. The catalyst membranes are preferably sandwiched between and in mutual contact with thin porous, sintered plates of niobium, which serve as conducting surfaces comprising the porous anodes and cathodes described above. Alternatively, the catalytic membranes may be sandwiched between platinum coated porous carbon paper or cloth, structurally supported by fine mesh niobium screens, porous ceramic, plastic or other inert material. Chambers 132 and 140 contain a porous wicking material such as asbestos fibers or porous ceramic to provide a capillary path for water flow between porous cathode 126 and porous anode 134, and between porous cathode 138 and porous anode 142. Typically, electrochemical compressor 12 would comprise a plurality of cells like that shown in FIG. 2, connected in parallel flow relationship, and electrically connected in series. Those of ordinary skill in the art will understand that a variety of materials may be used to construct electrochemical compressor 12. For this reason, further details concerning its structure need not be set forth herein to adequately disclose the present invention.

Figure 3:
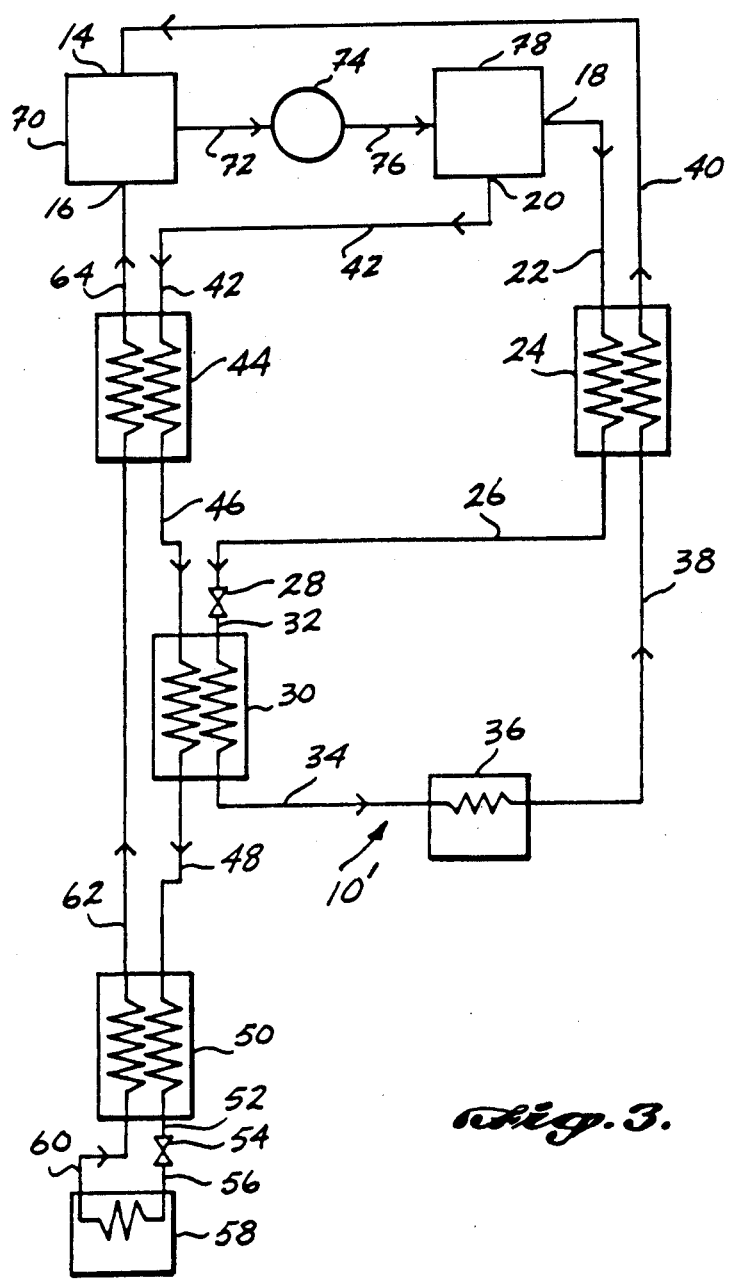
FIG. 3 is a schematic diagram of another embodiment of the cryogenic cooling system.

Turning now to FIG. 3, a second embodiment of the cryogenic cooling system is shown, generally denoted by reference numeral 10'. The second embodiment differs from the first primarily with respect to the design of the electrochemical compressor. In the second embodiment, the electrochemical compressor comprises a separate fuel cell 70, a mechanical pump 74 and an electrolysis cell 78. Fuel cell 70 uses a catalytic reaction to electrochemically combine low pressure hydrogen and oxygen, forming water, and producing as a by-product an electrical output current. The water produced by fuel cell 70 is conveyed through a water line 72 to mechanical pump 74, in which the pressure of the water is increased to about 20 MPa. The pressurized water is conveyed from the pump through a line 76 into electrolysis cell 78. In electrolysis cell 78, a catalytic reaction disassociates the high pressure water into high pressure oxygen, output through discharge port 18, and high pressure hydrogen, output through discharge port 20.

Fuel cell 70 performs much the same function as is performed by porous anode 122, catalytic membrane 124 and porous cathode 126 (see FIG. 2) of the first embodiment of the cryogenic cooling system 10. However, in the second embodiment, a mechanical pump 74 replaces porous anode 134, catalytic membrane 136 and porous cathode 138, which are used in the first embodiment to pressurize water. Similarly, electrolysis cell 78 performs a function equivalent to that performed by porous anode 142, catalytic membrane 144 and porous cathode 146 in the first embodiment, by dissociating the pressurized water into oxygen and hydrogen.

All other elements of the second embodiment of the cryogenic cooling system 10' operate in the same manner as the elements of the first embodiment and are similarly identified by corresponding reference numerals. The only other significant difference between the two embodiments is that cryogenic cooling system 10' uses a lower hydrogen mass flow, e.g., 6.24 milligrams per second as compared to the 7.3 milligrams per second assumed in calculating pressures and temperatures described for the first embodiment. The greater mass flow of hydrogen required by the first embodiment of cryogenic cooling system 10 compared to the second is due to the small mass of hydrogen ions transported through catalytic membrane 136 during the electrochemical pressurization of water molecules.

Since mechanical pump 74 consumes very little energy in pressurizing water, the overall energy requirements of fuel cell 70, water pump 74 and electrolysis cell 78 are substantially the same as electrochemical compressor 12 in the first embodiment. The only major advantage of the first embodiment compared to the second is that it does not require any mechanical device and therefore has a prospectively longer useful lifetime. However, water pump 74 can be designed to last for an extended period of time and may comprise almost any positive displacement type liquid pump. Both embodiments offer the improved operating refrigeration cycle efficiency associated with precooling the primary refrigerant fluid, hydrogen, to a temperature well below its inversion temperature.

Water carryover into either the compressed hydrogen or compressed oxygen loops is undesirable, since the water vapor will freeze as the temperature of the gases is reduced, potentially blocking gas flow. Water vapor may be excluded from the hydrogen loop by using a compound membrane diffuser to block the passage of relatively larger water molecules, while allowing the smaller hydrogen molecules to pass. An acceptable compound membrane would comprise, for example, a Nafion membrane coated with a thin foil layer of palladium-silver alloy (60/40). The small hydrogen molecules may pass through the pores of the Nafion membrane and palladium foil, while the water molecules are completely blocked. A similar approach could be used for separating water molecules from the compressed oxygen stream. Alternatively, a regenerable desiccant could be used to absorb water molecules, preventing them from entering the high pressure oxygen stream.

A further concern with respect to operation of hydrogen-based cryogenic cooling system concerns the relationship of ortho and para forms of hydrogen. Parahydrogen molecules (in which the electrons of the atoms forming the molecule have the same spin direction) are generally stable at low temperatures whereas orthohydrogen molecules (in which the atoms have electrons with opposite spin direction) are stable at high temperatures. The equilibrium percentage of parahydrogen compared to orthohydrogen is shown as a function of temperature in FIG. 5. Unless the conversion of ortho to para hydrogen is catalyzed during cool down of the gas within the high pressure flow path, spontaneous conversion can take place at or near Joule-Thomson expansion valve 54, which may result in reduced cooling capacity. In addition, as the low pressure hydrogen gas passes through regenerative heat exchangers 50 and 44, efficiency is improved by catalyzing the conversion of para to ortho.

Catalysts suitable for promoting the conversion of ortho to para hydrogen are discussed in U.S. Pat. No. 4,671,080, which has been incorporated herein by reference. These catalysts may be provided as a coating on both the low and high pressure hydrogen gas contacting surfaces of regenerative heat exchangers 44 and 50. In addition, the hydrogen gas contacting surfaces of the precooler heat exchanger 30 may be provided with the catalytic coating.

Although not shown in FIGS. 1 and 3, an accumulator vessel may be provided in the low pressure oxygen stream, for example, at any point along line 38, which connects parasitic heat exchanger 36 with regenerative heat exchanger 24. A similar accumulator for low pressure hydrogen gas may be provided in line 62, between regenerative heat exchangers 44 and 50. Both the oxygen and hydrogen accumulators provide storage for excess gas in the respective hydrogen and oxygen refrigerant cycles as the load on the cryogenic cooling system changes. Since accumulators such as these are commonly used in conventional refrigeration systems, they have not been shown in the drawing figures, and may be considered optional for inclusion as required for a variable load in a particular application of the present cryogenic cooling system.

While the cryogenic cooling system has been disclosed with respect to operation using hydrogen and oxygen as the primary and secondary cryogenic fluids, other fluids may also be used. Those of ordinary skill in the art will appreciate that these and other modifications may be made to the present invention within the scope of the claim that follow below.

The embodiments of the invention in which an exclusive property or privilege is claimed are defined as follows:

1. A refrigeration system comprising:
   (a) a compressor for compressing a first and a second fluid;
   (b) a precooler heat exchanger;
   (c) a primary heat exchanger;
   (d) a first and second expansion device;
   (e) first refrigerant cycle flow path means for providing fluid communication between:
      (i) the compressor and the first expansion device;
      (ii) the first expansion device and the precooler heat exchanger; and
      (iii) the precooler heat exchanger and the compressor; the compressed first fluid expanding as it passes through the first expansion device, providing cooling as it passes through the precooler heat exchanger, returning thereafter to the compressor; and
   (f) second refrigerant cycle flow path means for providing fluid communication between:
      (i) the compressor and the precooler heat exchanger;
      (ii) the precooler heat exchanger and the second expansion device;
      (iii) the second expansion device and the primary heat exchanger; and
      (iv) the primary heat exchanger and the compressor;
   (g) the compressed second fluid being cooled by the expanding first fluid in the precooler heat exchanger, the precooled compressed second fluid expanding as it passes through the second expansion device, and cooling a primary load as it passes through the primary heat exchanger, returning thereafter to the compressor.

2. The refrigeration system of claim 1, wherein the first fluid comprises oxygen and the second fluid comprises hydrogen.

3. The refrigeration system of claim 2, wherein the compressor includes means for combining the hydrogen and oxygen to form water.

4. The refrigeration system of claim 3, wherein the compressor includes means for increasing the pressure of the water.

5. The refrigeration system of claim 4, wherein the compressor includes means for dissociating the water into compressed hydrogen gas and compressed oxygen gas.

6. The refrigeration system of claim 5, wherein the means for increasing the pressure of the water comprise a positive displacement pump having an inlet in fluid communication with the means for combining the hydrogen and oxygen, and an outlet, in fluid communication with the means for dissociating the water, for supplying pressurized water thereto.

7. The refrigeration system of claim 1, wherein the first refrigerant cycle flow path means include a regenerative heat exchanger that provides heat exchange between the compressed and the expanded first fluid.

8. The refrigeration system of claim 1, wherein the first refrigerant cycle flow path means further include a parasitic heat exchanger disposed downstream of the precooler heat exchanger, expanded first fluid from the precooler heat exchanger providing cooling for a parasitic heat load.

9. The refrigeration system of claim 1, wherein the second refrigerant cycle flow path means include a regenerative heat exchanger for providing heat exchange between the compressed second fluid flowing from the compressor to the precooler heat exchanger and the expanded second fluid flowing from the primary heat exchanger, back to the compressor, the compressed second fluid being cooled thereby.

10. The refrigeration system of claim 1, wherein the second refrigerant cycle flow path means include a regenerative heat exchanger for providing heat exchange between the precooled compressed second fluid flowing from the precooler heat exchanger and the expanded second fluid flowing from the primary heat exchanger, back to the compressor, the precooled compressed second fluid being further cooled thereby.

11. The refrigeration system of claim 1, further comprising conditioning means for removing water vapor from the compressed first and second fluids.

12. A refrigeration system comprising:
(a) an electrochemical compressor for compressing a first and a second gas;
(b) a first cooling loop and a second cooling loop, the first cooling loop providing precooling for the second cooling loop, the second cooling loop providing cooling for a primary load at a minimum temperature substantially below that achieved by the first cooling loop;
(c) means for conveying the first gas in the first cooling loop, including means for expanding the compressed first gas to precool the second gas and means for returning the expanded first gas to the electrochemical compressor; and
(d) means for conveying the second gas in the second cooling loop, including means for expanding the precooled compressed second gas to cool the primary load and means for returning the expanded second gas to the electrochemical compressor.

13. The refrigeration system of claim 12, wherein the first gas comprises oxygen and the second gas comprises hydrogen.

14. The refrigeration system of claim 13, wherein the electrochemical compressor comprises fuel cell means for ionizing and chemically combining the hydrogen and oxygen to form water molecules, using a catalytic reaction, and for producing an electrical current.

15. The refrigeration system of claim 14, wherein the electrochemical compressor further comprises electrolysis means for dissociating the water molecules into separate compressed first and second gases comprising hydrogen molecules and oxygen molecules using an electric current.

16. The refrigeration system of claim 15, wherein the electrochemical compressor further comprises pump means for pressurizing the water prior to its dissociation by the electrolysis means.

17. The refrigeration system of claim 15, wherein the electrolysis means use the electric current produced by the fuel cell means.

18. A method for cooling a primary load to a cryogenic temperature, comprising the steps of:
(a) compressing a first and a second cryogenic gas with an electrochemical compressor;
(b) circulating the first cryogenic gas in a first cooling loop;
(c) circulating the second cryogenic gas in a second cooling loop;
(d) adiabatically expanding the compressed first cryogenic gas to precool the compressed second cryogenic gas below its inversion temperature;
(e) adiabatically expanding the precooled compressed second cryogenic gas to cool the primary load; and
(f) returning the expanded first and second cryogenic gases to the electrochemical compressor.

19. The method of claim 18, wherein the step of compressing the first and the second cryogenic gases comprises the steps of:
(a) chemically combining the expanded first and the second cryogenic gases to form a liquid;
(b) increasing the pressure of the liquid; and
(c) electrolytically dissociating the liquid into the first and the second cryogenic gases at a substantially higher pressure than that at which the expanded first and second cryogenic gases were chemically combined.

20. The method of claim 19, wherein the step of pressurizing the liquid comprises the step of pumping the liquid through a catalytic membrane.

21. The method of claim 19, wherein the first cryogenic gas comprises oxygen, the second cryogenic gas comprises hydrogen, and the liquid comprises water.

22. The method of claim 18, further comprising the step of regeneratively cooling the compressed first cryogenic gas with the expanded first cryogenic gas after said expanded first cryogenic gas has precooled the second cryogenic gas.

23. The method of claim 18, further comprising the step of cooling a parasitic heat load with the expanded first cryogenic gas after precooling the second cryogenic gas.

24. The method of claim 18, further comprising the step of regeneratively cooling the compressed second cryogenic gas with the expanded second cryogenic gas after cooling the primary load.

25. The method of claim 18, further comprising the step of regeneratively cooling the compressed second cryogenic gas both before and after it is precooled by the first cryogenic gas.

26. The method of claim 18, further comprising the step of removing a liquid from the compressed first and second cryogenic gases prior to their expansion.

27. A refrigeration system, comprising:

(a) a compressor for simultaneously compressing a primary and a second working fluid;

(b) a precooler heat exchanger connected to the compressor for cooling the primary working fluid with the secondary working fluid;

(c) a precooling flow path for the secondary working fluid comprising an expander connected between the compressor and precooler heat exchanger and a return line between the compressor and precooler heat exchanger;

(d) a primary expander connected to the precooler heat exchanger for expanding the primary working fluid after it passes through the precooler heat exchanger;

(e) a primary heat exchanger connected to the primary expander for cooling a load with the expanded, primary working fluid; and (f) a conduit between the primary heat exchanger and compressor to return warm, expanded, primary working fluid to the compressor.

28. The refrigeration system of claim 27, wherein the compressor has no moving parts.

29. The refrigeration system of claim 27, wherein the compressor is an electrochemical compressor.

30. The refrigeration system of claim 29, wherein the electrochemical compressor includes a fuel cell, a mechanical pump, and an electrolysis cell.

31. The refrigeration system of claim 27, wherein the primary working fluid is hydrogen; the secondary working fluid is oxygen and the precooler heat exchanger operates to cool the hydrogen below its inversion temperature.

32. The refrigeration system of claim 31, wherein the compressor includes a low pressure hydrogen chamber, a low pressure oxygen chamber, and a sandwich layer between the chambers, the sandwich layer comprising a porous anode, a catalytic membrane, and a porous cathode, wherein the sandwich layer combines the hydrogen and oxygen to form water.

33. A refrigeration system comprising:
(a) compressor means for simultaneously compressing a first and a second gas, including means for chemically combining and then dissociating the gases;

(b) a first cooling loop connected to the compressor means, for conveying the first gas to and from the compressor means in a first refrigeration cycle;

(c) a second cooling loop connected to the compressor means, for conveying the second gas to and from the compressor means in a second refrigeration cycle;

(d) first and second expansion devices disposed respectively in the first and second cooling loops;

(e) first heat transfer means, disposed within the first and second cooling loops, said first heat transfer means transferring heat from the second gas to the expanded first gas prior to passage of the second gas through the expansion device in its cooling loop; and (f) second heat transfer means, disposed within the second cooling loop downstream of the second expansion device, for transferring heat from a primary load to the expanded second gas.

34. The refrigeration system of claim 33, wherein the compressor means includes no moving parts.

35. The refrigeration system of claim 33, wherein the compressor means comprises an electrochemical compressor.

36. The refrigeration system of claim 35, wherein the electrochemical compressor includes a fluid cell, a mechanical pump, and an electrolysis cell.

37. The refrigeration system of claim 33, wherein the first gas is oxygen and the second gas is hydrogen, and wherein the means for chemically combining the first and second gases forms water.

38. A method for cooling a plurality of loads, comprising the steps of:
(a) compressing a first and a second gas, said step of compressing including the steps of:
(i) chemically combining the first and second gases to form a liquid;
(ii) increasing the pressure of the liquid; and
(iii) dissociating the liquid into the first and second gases at higher pressures than when they were chemically combined;

(b) circulating the compressed first and second gases through separate closed loop flow paths;

(c) expanding the compressed first gas to cool a first load; and (d) expanding the compressed second gas to cool a second load.

39. The method of claim 38, wherein the first load includes heat transferred from the compressed second gas to the expanded first gas.

40. The method of claim 38, wherein the first gas is oxygen and the second gas is hydrogen, said step of chemically combining the first and second gases forming water as the liquid.

41. The method of claim 38, wherein the first and second gases are compressed in an electrochemical compressor having no moving parts.

42. The method of claim 38, wherein the pressure of the liquid is increased using a mechanical pump.

43. The method of claim 38, further comprising the step of transferring heat from the compressed first gas to the expanded first gas, after the expanded first gas has cooled the first load.

44. The method of claim 43, further comprising the step of transferring heat from the compressed second gas to the expanded second gas, after the expanded second gas has cooled the second load.

* * * * *